C. A. PARSONS, A. Q. CARNEGIE & S. S. COOK.
GEAR CUTTING MACHINE.
APPLICATION FILED MAR. 25, 1913.

1,252,482.

Patented Jan. 8, 1918.
6 SHEETS—SHEET 1.

WITNESSES
C. E. Parsons
Ewd L. Tolson

INVENTORS:
Charles A. Parsons,
Alfred Q. Carnegie,
Stanley S. Cook,
by Middleton Donaldson
ATTORNEYS C. A. PARSONS, A. Q. CARNEGIE & S. S. COOK.
GEAR CUTTING MACHINE.
APPLICATION FILED MAR. 25, 1913.

1,252,482.

Patented Jan. 8, 1918.
6 SHEETS—SHEET 2.

WITNESSES
C. E. Parsons
Ewd L. Tolson

INVENTORS:
Charles A. Parsons,
Alfred Q. Carnegie,
Stanley S. Cook,
by Spear Middleton Donaldson
ATTORNEYS C. A. PARSONS, A. Q. CARNEGIE & S. S. COOK.
GEAR CUTTING MACHINE.
APPLICATION FILED MAR. 25, 1913.

1,252,482.

Patented Jan. 8, 1918.
6 SHEETS—SHEET 3.

WITNESSES
H. L. Alden
Ewd L. Tolson

INVENTORS:
Charles A. Parsons,
Alfred Q. Carnegie,
Stanley S. Cook,
by Spear Middleton Donaldson
ATTORNEYS C. A. PARSONS, A. Q. CARNEGIE & S. S. COOK.
GEAR CUTTING MACHINE.
APPLICATION FILED MAR. 25, 1913.

1,252,482.

Patented Jan. 8, 1918.
6 SHEETS—SHEET 4.

WITNESSES:
Edwd L. Tolson
H. M. Barrett

INVENTORS:
Charles A. Parsons,
Alfred Q. Carnegie, &
Stanley S. Cook.
BY Shem Middleton Donaldson ffrm
ATTORNEYS.

C. A. PARSONS, A. Q. CARNEGIE & S. S. COOK.
GEAR CUTTING MACHINE.
APPLICATION FILED MAR. 25, 1913.

1,252,482.

Patented Jan. 8, 1918.
6 SHEETS—SHEET 5.

WITNESSES:

INVENTORS:
Charles A. Parsons,
Alfred Q. Carnegie, &
Stanley S. Cook,
BY
ATTORNEYS.

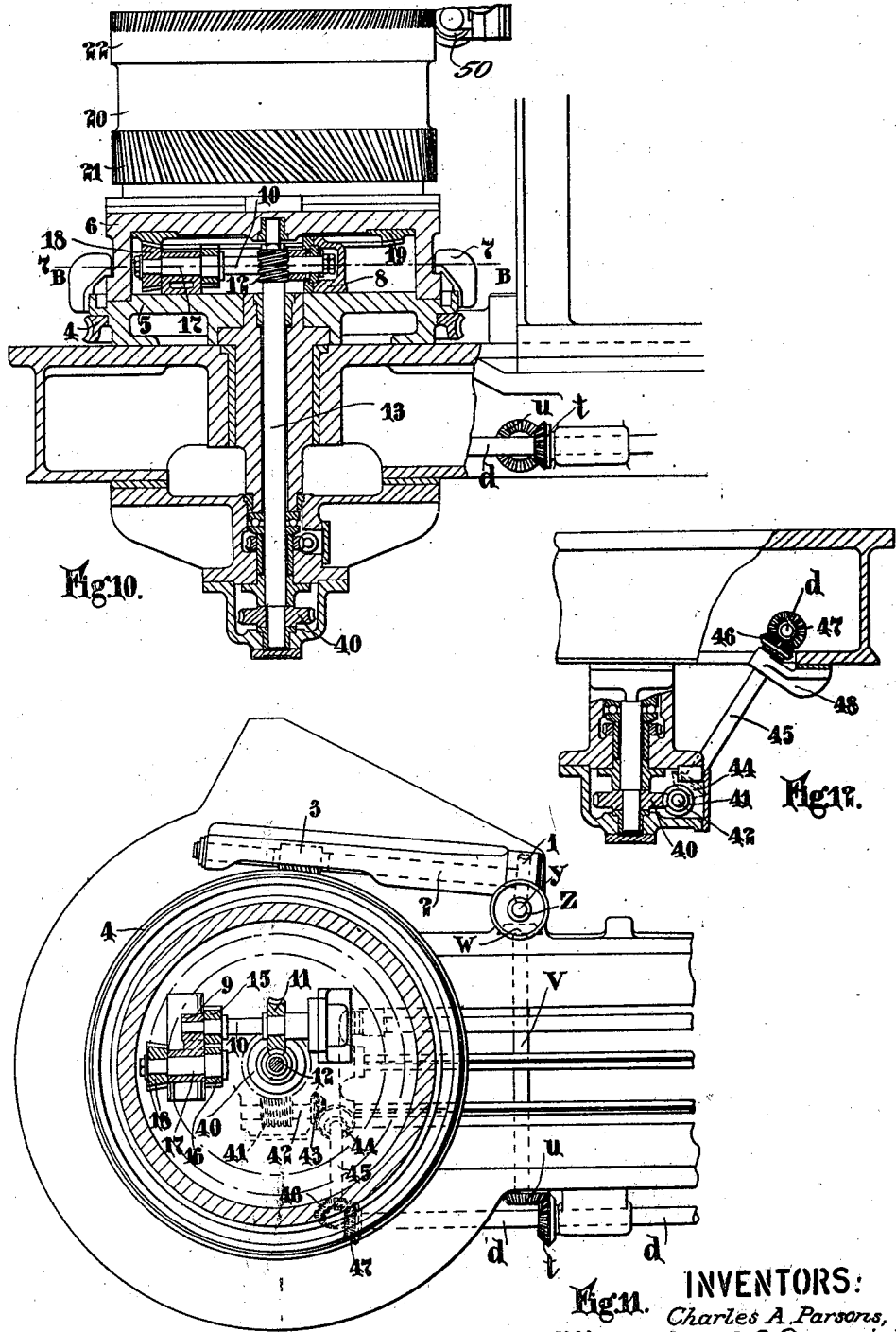

UNITED STATES PATENT OFFICE.

CHARLES ALGERNON PARSONS AND ALFRED QUINTIN CARNEGIE, OF NEWCASTLE-UPON-TYNE, AND STANLEY SMITH COOK, OF WALLSEND, ENGLAND; SAID CARNEGIE AND COOK ASSIGNORS TO SAID PARSONS.

GEAR-CUTTING MACHINE.

1,252,482.

Specification of Letters Patent.    Patented Jan. 8, 1918.

Application filed March 25, 1913. Serial No. 756,762.

*To all whom it may concern:*

Be it known that we, the honorable Sir CHARLES ALGERNON PARSONS, K. C. B., of Heaton Works, Newcastle-upon-Tyne, Northumberland, England, ALFRED QUINTIN CARNEGIE, of Heaton Works, Newcastle-upon-Tyne, Northumberland, England, and STANLEY SMITH COOK, of Turbinia Works, Wallsend-upon-Tyne, Northumberland, England, subjects of the King of Great Britain and Ireland, have invented certain new and useful Improvements in Gear-Cutting Machines, of which the following is a specification.

This invention relates to a method of and means for cutting the teeth in gear wheels, and has for its object to construct such wheels with a higher degree of accuracy than is obtainable with the processes at present adopted.

While the present machines cut the teeth with a high order of accuracy, a still higher degree of accuracy is desirable to insure the silent operation of gear wheels when transmitting large powers at high speeds, and also to minimize the wear of the teeth. It is obvious that with the processes already adopted the accuracy of the finished wheel cannot be greater than that of the parent gear of the machine by which the teeth are cut. Local irregularities in this parent gear cause irregularities in the teeth of the wheels being cut which exactly correspond in angular position with those of the parent gear, and which, when such wheels are in operation for the transmission of power, will give rise to periodic vibrations, often of high frequency, and therefore productive of noise. In the case, for instance, in which the table on which the work is mounted is rotated by means of a worm and a worm wheel, the latter being attached permanently to the table, it will be seen that the irregularities formed on the work are a function of the angular position of the table in relation to the position of the worm. The latter is usually fixed and since the cutter is also usually in a fixed position on the machine, and advances across the work in a direction parallel to the axis of the table, there will result lines of irregularities on the finished wheel lying in planes through the axis of the table, and therefore of the work mounted thereon.

It will be seen that irregularities so positioned will, when the wheel is at work, come into mesh simultaneously across the face of the wheel, thus causing irregularities in the relative rotational motion of the wheel and pinion engaging therewith. If, however, a small amount of rotary motion relative to the table be imparted to the work it will be seen that the irregularities formed in the work will be distributed spirally around the wheel, and that if this relative creep be considerable, these spirals will make a small angle with the plane of revolution of the wheel, and will consequently lie closely to each other, with the result that the pinion and wheel will, when geared together, preserve a constant relative angular velocity between them.

The present invention consists in providing means for distributing the irregularities formed in the work in spirals making a comparatively small angle with the plane of revolution of said work, whereby the periodic correspondence of said irregularities with the irregularities of the parent gear rotating the same is destroyed.

The invention also consists in producing a continuous variation in the relative angular position of the axis of the final driving member of a system of gearing imparting motion to the work and the plane of rotation of the cutter.

The invention further consists in imparting motion to the work by a system of gearing, the axis of the final driving member of which is made to revolve slowly about the axis of said work, the plane of the rotation of the cutter being fixed, by which means the irregularities formed in the work are made to lie obliquely, that is, in planes which do not pass through the axis of the work.

The invention also consists in mounting the work upon a table having a small rotary motion relative to the driven member of the parent gear rotating the work. This relative rotation may be produced by a movement superposed on the rotation of the driven member by a train of gearing attached either to said table or to said driven member, and rotated therewith around the axis of the work, during which latter said train of gearing is itself caused to rotate.

The invention further consists in the improvements in gear cutting machines hereinafter described.

It will be seen that when the irregularities arise from want of accuracy in the driven member of the parent gear rotating the work, for instance, in the arrangement usually adopted, the worm, or arise from errors in the individual teeth of the worm wheel or driven member of the parent gear, such irregularities will be periodic and equal in number to the worm wheel teeth. There will be in consequence high points on the faces of the teeth of the finished wheel lying in a series of equi-distant planes passing through the axis. Between these planes of high points will be similar planes of low points. If now the work is given a relative movement corresponding to half the pitch of the worm wheel teeth, this relative movement being effected while the cutter advances across the wheel by an amount equal to the "feed" per revolution a point left high by the cutter at one point will be practically annulled in the succeeding revolution and the series of alternate planes of high and low points respectively will be replaced by a series of planes of low points. At the same time in planes again intermediate between these planes of low points, the cutter retains its correct position for succeeding revolutions. There will therefore result from such a relative movement of the work a series of planes of irregularities of double the frequency and half the amplitude of the original.

It is preferred, therefore, to make the relative motion of the work per revolution of the driven member of the parent gear correspond to a fraction of the pitch of the teeth on such driven member only slightly differing from a half, for instance .6 of the pitch (or 1.6, 2.6, etc.)

Referring now to the accompanying drawings:—

Fig. 10 is a part sectional elevation illustrating a further modification in which rotary motion is imparted to the central spindle.

Fig. 11 is a part sectional plan of Fig. 10.

Fig. 12 is a part sectional front elevation showing details of the driving connections.

Figure 1:
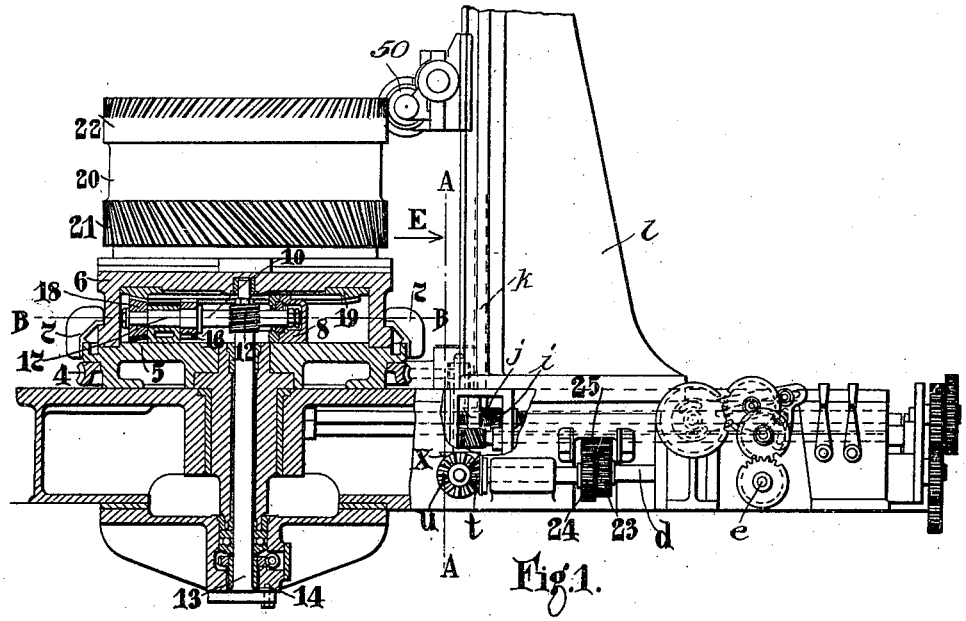
Figure 1 represents a side view partly in section and partly in elevation of a gear cutting machine in which the present invention is carried into effect.
Figure 3:
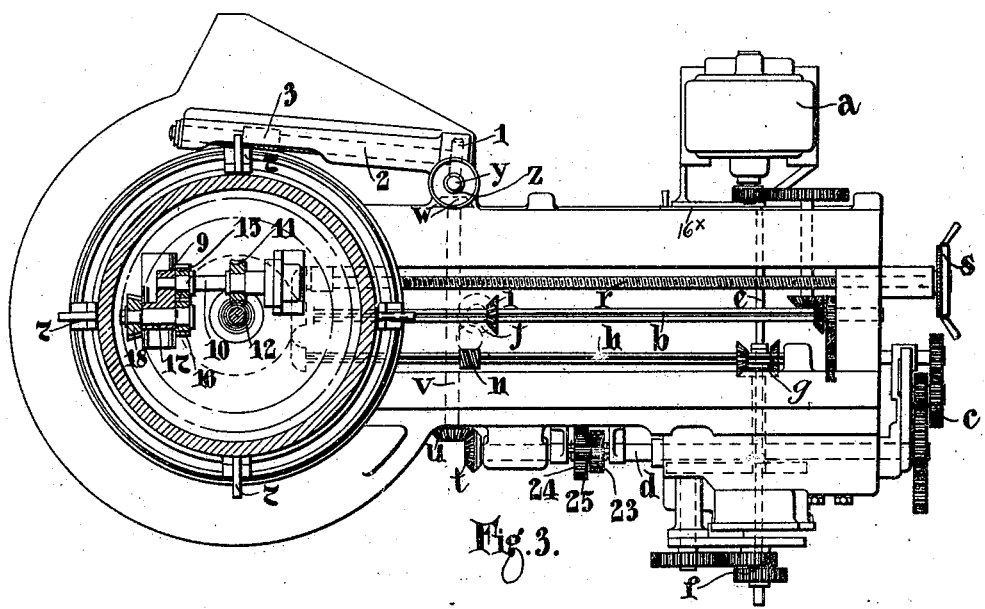
Fig. 3 is a plan view of the machine shown in Fig. 1, the standard for the cutter being removed and the sectional view being taken on the line B—B.
Figure 2:
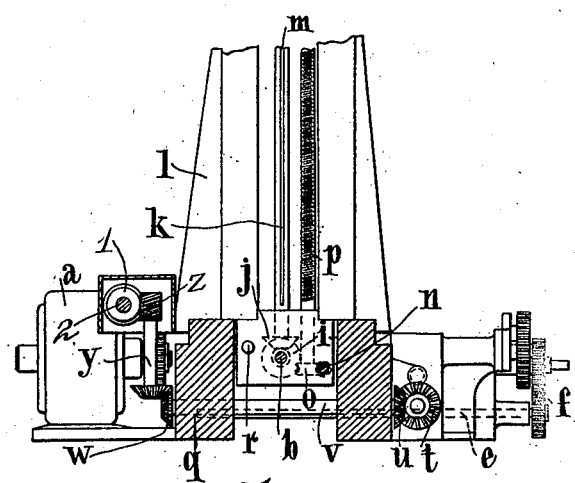
Fig. 2 is a sectional view on the line A—A of Fig. 1 looking in the direction of the arrow, E.

According to the arrangement illustrated in Figs. 1 to 3, the gear cutting machine is driven by an electric motor, $a$, which drives through suitable gearing the spindle $b$, from which motion is transmitted through suitable change speed gearing, $c$, to the shaft, $d$. Motion is also transmitted from the motor, $a$, through the shaft, $d$, to a cross shaft and gear wheels $f$, and through a reversing gear, $g$, to the spindle, $h$. The gear wheels, $f$, form a change gear by which the helical angle of the teeth formed on the work is controlled through the usual differential in shaft $d$. The shaft $e$ is a part of a connection for shifting reversing gears at $g$, said shaft being operated by the hand lever $16^x$. The spindle, $b$, carries a bevel wheel, $i$, gearing with another bevel wheel, $j$, mounted on a vertical spindle, $k$, mounted in the cutter standard, $l$. The vertical spindle, $k$, is provided with a feather-way $m$, by which its rotation is transmitted to the cutter. The spindle, $h$, is provided with a worm, $n$, which engages with a worm wheel, $o$, on another vertical spindle, $p$, mounted in the cutter standard, $l$. This spindle, $p$, is threaded, and when rotated causes a vertical up or down movement of the cutter, thus moving the cutter across the face of the work. The cutter standard, $l$, is provided with suitable means for being traversed longitudinally on the bed, $q$, of the machine, by means of the threaded spindle, $r$, which can be rotated by the hand wheel, $s$. The construction so far described is of a usual character and forms no part of the present invention.

The rotation of the shaft, $d$, is transmitted direct or through suitable compensating gear as shown at 23, 24, 25, and as will be hereinafter described, to a bevel wheel, $t$, engaging with another bevel wheel, $u$, on a horizontal shaft, $v$, carrying at its other end another bevel wheel, $w$. This engages with yet a further bevel wheel, $x$, on a vertical shaft, $y$, carrying at its other end a worm, $z$, engaging with a worm wheel, 1, on a shaft 2, provided with a worm, 3. This worm, 3, engages with a worm wheel, 4, mounted upon a primary table, 5. The worm, 3, and worm wheel, 4, form the parent gear rotating the work, the worm 3, being the driving member and the worm wheel, 4, attached to the primary table, 5, constituting the driven member. That is to say, the worm 3 and worm wheel 4 constitute the indexing or dividing device of the gear cutting machine, which serves to space the teeth formed upon the work blank. Mounted upon the primary table, 5, and centered thereon in the manner shown is a secondary table 6, the brackets, 7, preventing the secondary table from being lifted off the primary table. Mounted in suitable bearings, 8, 9, on the primary table, 5, is a spindle, 10, carrying a worm wheel, 11, engaging with a worm, 12, on a spindle, 13, prevented from rotating by suitable means such as the stud, 14. The spindle, 10, also carries a spur wheel, 15, engaging with a spur wheel, 16, mounted upon a second spindle, 17, supported in the bearing, 9, and carrying at its other end a bevel wheel, 18. This bevel wheel engages with a ring of teeth 19, on the secondary table, 6. The work, 20, is fixed to the secondary table, 6, in any convenient manner and in Fig. 1 is shown as a gear wheel having two sets of teeth, 21, 22, the latter of which are in process of being formed by the hob cutter 50. The operation of the arrangement is as follows:—

Motion is imparted in the manner already described to the worm, 3, and from thence to the worm wheel, 4, of the primary table, 5. The spindle, 10, rotates with the primary table, 5, thus carrying the worm wheel, 11, around the worm, 12. The spindle, 10, is thus caused to revolve, which rotation is imparted by the spur wheels, 15, 16, to the spindle, 17, and bevel wheel, 18. In this way the axis of the bevel wheel, 18, is caused to revolve slowly about the axis of the work, 20, thereby giving the secondary table, 6, a rotary movement relative to the primary table, 5. Thus the work, 20, also has a rotation relative to the worm wheel, 4. Since the worm, 12, is right handed it will be seen that the secondary table, 6, will advance relative to the primary table, 5, in whatever direction the latter is in itself rotating.

In this manner the irregularities formed in the work 20, due to the periodic errors arising from inaccuracy in the worm, 3, or worm wheel, 4, forming respectively the driving and driven members of the parent gear rotating the work fall in succeeding revolutions in different angular positions and the resulting irregularities of the finished work are therefore not periodic, but are distributed in spirals around the work which, if the relative motion of the work, 20, in relation to the worm wheel, 4, is sufficient, will make a small angle with the plane of rotation of the work, and thus lie closely to each other. When, therefore, the finished wheel is in use a constant relative angular velocity will be preserved between it and the pinion engaging therewith, while the irregularities themselves will tend to wear to a uniform average surface.

It will be understood that the effect of the gearing interposed between the primary table and the work-table is to cause a relative motion between them, which motion must be added to or subtracted from the motion due to the parent gears 3, 4, according to whether the gearing is arranged to accelerate or retard the work-table with respect to the primary table.

In order to accommodate the relative movement between the secondary table 6 and the worm wheel, 4, without correcting the change speed gear $c$, when applying the present invention to existing gear cutting machines, it is preferable to employ compensating gear in the drive to the worm, 3. Such compensating gear is shown in Figs. 1 and 3, and consists in a spur wheel 23 mounted on the shaft, $d$, and a second spur wheel, 24, mounted on a shaft which also carries a bevel wheel, $t$; both the spur wheels, 23 and 24, are arranged to engage with a pinion, 25, and since the spur wheels, 23 and 24, are of different size there will be a relative rotation between the wheels, 23 and 24, and consequently of the shafts on which they are mounted. In this way the speed of the rotation of the worm, 3, can be adjusted to maintain the correct speed of rotation of the work, 20 with respect to the cutter, in spite of the relative movement between the secondary table, 6, on which the work is mounted, and the primary table, 5, to which the worm wheel, 4, is attached. That is to say by this compensating gearing 23, 24, 25 the speed at which the index wheel is driven is reduced by the same amount as the speed of the worktable is increased, thereby preventing the accelerated speed of the worktable relative to the index wheel from having any effect on the helical twist.

Figure 4:
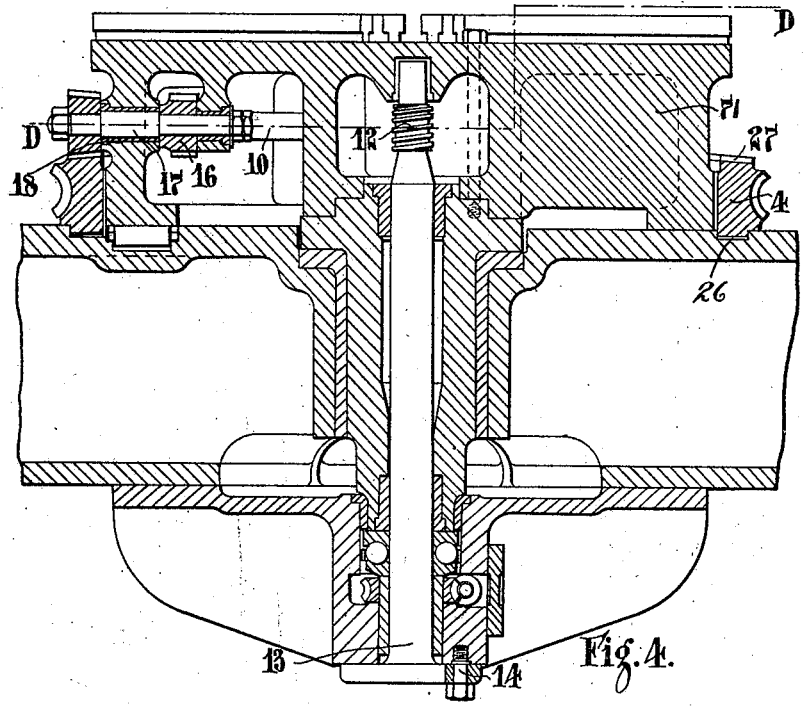
Figs. 4 and 5 are two views of a modification. The view in Fig. 4 is a section on the line C—C of Fig. 5, the view shown in Fig. 5 being taken on the line D—D of Fig. 4.
Figure 5:
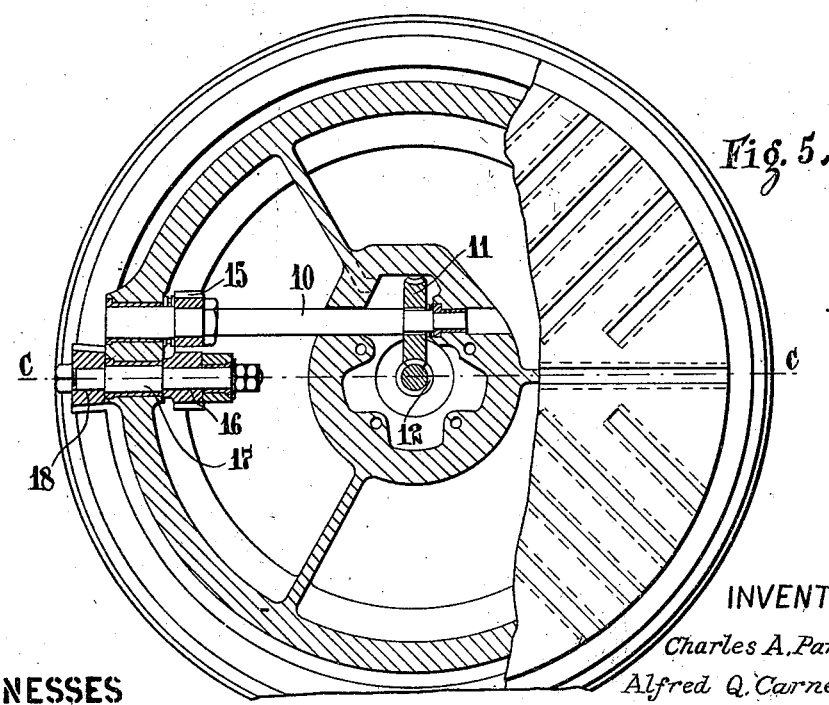
Figure 6:
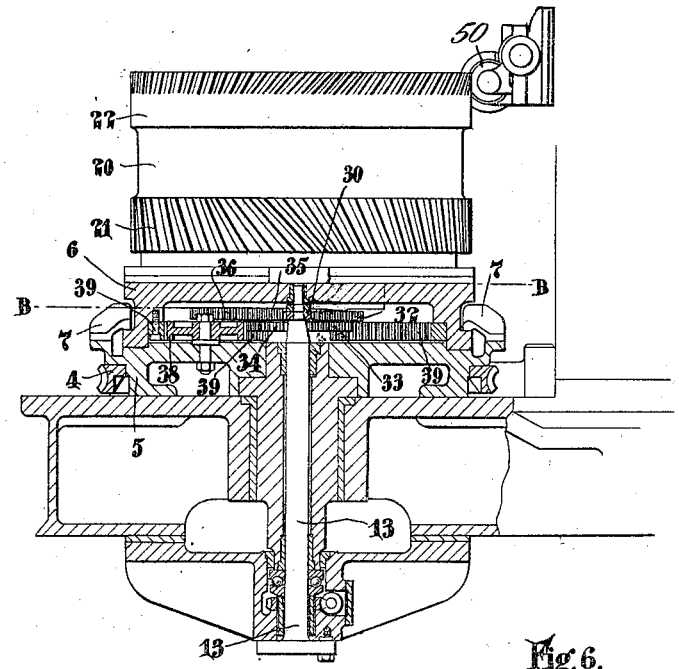
Fig. 6 shows a modification in which a train of spur and pinion wheels carried by a primary table is employed.
Figure 7:
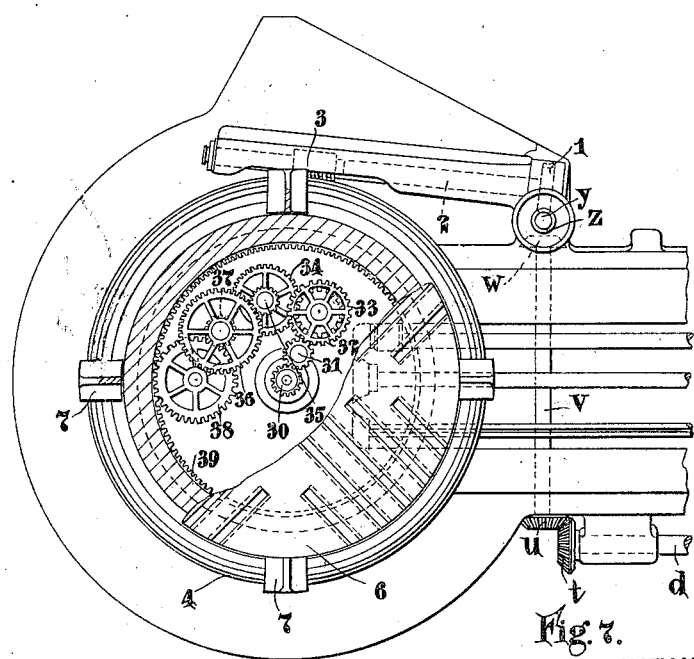
Fig. 7 is a part sectional plan of Fig. 6.
Figure 8:
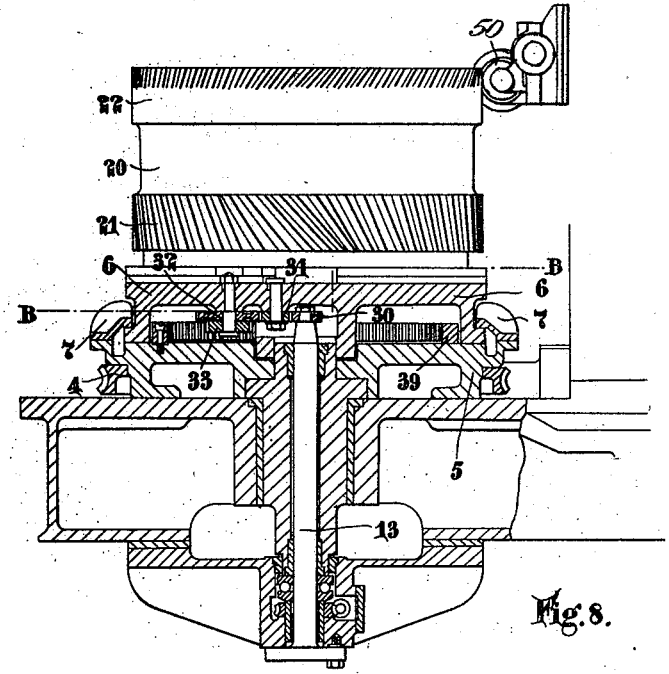
Fig. 8 is a part sectional elevation of a modification in which a train of spur and pinion wheels is employed, carried upon a secondary table.
Figure 9:
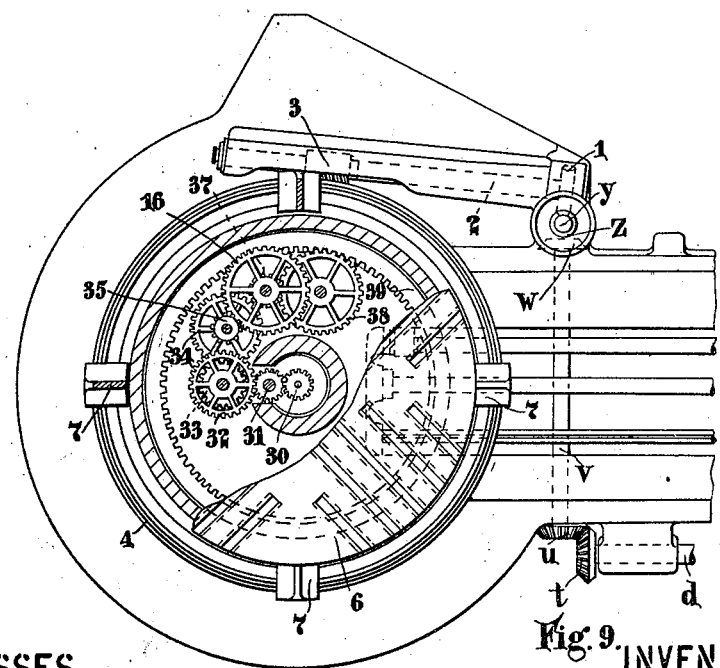
Fig. 9 is a part sectional plan view of Fig. 8.

According to the arrangement shown in Figs. 4 and 5, the primary table, 5, is dispensed with. The worm wheel, 4, forms a separate element and rotates in a groove, 26, as shown, and is provided on its upper side with a ring of teeth, 27. A single table, 71, upon which the work is mounted is then sufficient, and this carries in suitable bearings the spindle, 10, which is provided as before with a worm wheel 11 and a spur wheel, 15, the latter engaging with the spur wheel, 16, on a spindle, 17, which also carries a bevel wheel, 18. A non-rotatable spindle, 13, provided with a worm, 12, which engages the worm wheel, 11, is also provided.

In a similar way to that already described in connection with the form shown in Figs. 1 to 3, the rotation of the spindle, 10, about its own axis due to its rotation with the table, 6, around the worm, 12, is superposed upon the rotation of the worm wheel, 4, thus causing a relative movement between the table, 71, and the worm wheel, 4, the former advancing in the direction of rotation of the latter since the worm, 12, is again right handed.

According to a further form of the invention the fixed spindle 13 carries a pinion wheel 30 which operates a train of spurs 32, 34, 36 and 38, and pinions 31, 33, 35 and 37 mounted upon the primary table 5, the last wheel 38 gearing with an annular wheel 39 mounted concentrically upon the secondary table 6.

It will be seen that the movement of the train of wheels about the stationary pinion 30, causes the former to revolve and to operate upon the annular wheel 39, attached to the secondary table 6, which is thus given a motion relative to the primary table 5, the amount of such motion depending upon the proportions adopted in the gearing.

In a still further form, the gearing between the tables 5 and 6, may be such that the train of spur wheels and pinions 31, 32, 33, 34, 35, 36, 37 and 38, are attached to the secondary table 6, and engage with a circular rack 39 upon the primary table 5.

It will further be seen that the gearing by which the relative motion is obtained instead of being operated by engagement with a stationary spindle such as the spindle 13, of the foregoing modifications Figs. 1 to 9 may be operated by other suitable means for instance through gearing from the main drive. For instance, this central spindle 13 instead of being stationary may be given a backward rotation at ten or twenty times the speed of rotation of the work.

This may be effected by providing upon the bottom of the spindle 13, a worm wheel 40, engaging a worm 41 upon a shaft 42, journaled in any suitable bearings and carrying upon its end a bevel wheel 43, which engages a bevel wheel 44 upon a shaft 45. This shaft 45, is journaled at its upper end in a suitable bearing 48, and is inclined at such an angle that a bevel wheel 46, at its upper end can engage a bevel wheel 47, situated upon an extension of the shaft $d$. The shaft $d$, is as shown in Figs. 1 and 3, connected through gearing $c$, to the main driving member $a$.

It will be seen that in all the foregoing modifications there is produced a continuous variation in the relative angular position of the axis of the final driving member of a system of gearing imparting motion to the work and the plane of revolution—that is, the plane at right angles to the axis of rotation—of the cutter.

Having now described our invention, what we claim as new and desire to secure by Letters Patent is:—

1. A helical gear hobbing machine, comprising in combination, a worktable, an index wheel, means to rotate said wheel, means actuated by the rotation of said wheel acting to cause rotation of said table at a speed different from said wheel, a hob, means to rotate said hob, means between said hob rotating means and said index wheel rotating means to preserve correct indexing relation between the rotations of said hob and the rotation of said table, means to feed said hob, and means between said hob feeding means and said index wheel rotating means to preserve correct lead relation between said hob and said table.

2. In combination, in a helical gear hobbing machine, a hob, toothed indexing means, means for imparting to the work a movement relatively to the indexing means for effecting the distribution of errors about the work, and means for operating the hob and the indexing means to obtain indexing and helical lead.

3. In combination, in a helical gear hobbing machine, a hob, toothed indexing means, means for changing the angular relation between a given tooth on the work and a given indexing tooth during the rotation of the work, whereby errors are distributed about the work, and means for operating the hob and the indexing means to obtain indexing and helical lead.

4. In combination, in a helical gear hobbing machine, a work-carrying table, a hob having a traversing movement across the work, indexing means including toothed gearing and driving means therefor for driving the table, means for giving the indexing means an additional movement proportional to the traversing movement of the hob for obtaining lead, and means actuated by said indexing means and actuating said table to cause the latter to rotate at a different speed from the indexing means for distributing errors about the work.

5. In combination, in a helical gear hobbing machine, a hob, an index wheel, a worktable, means for moving the worktable in relation to the indexing wheel to distribute errors about the work, and means for operating the indexing wheel and hob for indexing and helical lead, the speed of the index wheel being varied proportionately to the change in speed of the worktable relative to the indexing wheel to preserve the desired lead, substantially as described.

6. A helical gear hobbing machine, comprising in combination, a worktable, an index wheel, means to rotate said wheel, means actuated by the rotation of said wheel and acting to cause rotation of said table at a greater speed than said wheel, a hob, means to rotate said hob, means to feed said hob, and means between said hob feeding means and said index wheel rotating means to preserve correct lead relation between said hob and said table.

7. A helical gear hobbing machine comprising in combination a primary table, means to rotate said table, a work carrying secondary table, rotatably mounted upon said primary table, a train of gearing positioned between the two tables and actuated by one of said tables and acting to produce relative motion between them, the axis of the final driving member of said train being caused to revolve about the axis of rotation of the work carrying table, a hob, means to rotate said hob, means between said hob rotating means and said primary table rotating means to preserve correct indexing relation between the rotations of said hob and the rotation of said secondary table, means to feed said hob, and means between said hob feeding means and said primary table rotating means to preserve correct lead relation between said hob and the secondary table.

8. A gear cutting machine comprising, in combination, a primary table, means for rotating the same, a secondary table for supporting the work and rotatably mounted on the primary table, a center spindle about which the primary table turns, a train of gearing mounted on the primary table and connected at one end with the center spindle and at its other end with the secondary table, said train of gearing being rotated by the revolution of the primary table about the center spindle, and thereby causing the secondary table to rotate at a different rate of speed from the primary table, substantially as described.

9. A gear cutting machine comprising in combination a work table, indexing means, and means actuated by said indexing means acting to cause relative rotation of said table at a different speed from said indexing means.

10. A gear cutting machine comprising a work-carrying table, a cutter, means for feeding said cutter, parent gear comprising driving and driven members rotating said table, gearing between said driven member and said table for imparting to said table a constant motion relative to said driven member, said relative motion being dependent only on the dimensions of said gear and independent of the feed of the cutter.

11. A gear cutting machine comprising a table upon which the work is mounted, a cutter, means for feeding said cutter, parent gear comprising driving and driven members rotating said table, and means for imparting to the table a constant rotary motion relative to the driven member of said parent gear and independent of the feed of the cutter.

In testimony whereof, we affix our signatures in presence of two witnesses.

CHARLES ALGERNON PARSONS.
ALFRED QUINTIN CARNEGIE.
STANLEY SMITH COOK.

Witnesses:
CHARLES P. MARTIN,
BERTRAM H. MATTHEWS.